Patented Feb. 23, 1937

2,072,004

UNITED STATES PATENT OFFICE 2,072,004

CINCHONA BARK ALKALOID DERIVATIVE

George Lutz, Rocky River, Ohio, assignor, by mesne assignments, to E. I. du Pont de Nemours & Company, Wilmington, Del., a corporation of Delaware No Drawing. Application December 23, 1933, Serial No. 703,844

18 Claims. (Cl. 148—8)

This invention relates to processes of cleaning and pickling metals by the action of acids thereon, and is particularly directed to the use in cleaning and pickling baths of certain new organic substances which I have found to have the property of inhibiting the action of acids upon the metal itself, without in any substantial manner hindering the action of acids on the oxide, rust, scale, or other undesirable incrustations which are to be removed.

My new organic substances are reaction products of carboxylic acids with cinchona bark alkaloids, and derivatives thereof obtained by the subsequent sulfurization of such reaction products.

The chemical composition of the reaction products of cinchona bark alkaloids and carboxylic acids is at present unknown to me. The chemical evidence available leads me to believe that they are not merely salts, such as would be obtained by dissolving the cinchona bark alkaloids in dilute carboxylic acids, but that a more profound chemical change takes place when acting with concentrated carboxylic acids upon the cinchona bark alkaloids. For the purposes of this application I shall refer to these products as carboxylic acid derivatives of cinchona bark alkaloids.

These carboxylic acid derivatives of cinchona bark alkaloids are more efficient inhibitors than the untreated cinchona bark alkaloids, are different in physical appearance, and are more readily soluble in dilute acids. It is noted that the reaction between the cinchona bark alkaloids and carboxylic acids is slightly exothermic.

The compounds which I obtain by sulfurizing my carboxylic acid derivatives of cinchona bark alkaloids are even more efficient as inhibitors. These sulfurized compounds, which for the purposes of this application I shall call sulfurized carboxylic acid derivatives of cinchona bark alkaloids, are different in color and solubility from the unsulfurized products.

My sulfurized carboxylic acid derivatives of cinchona bark alkaloids exhibit different properties than do the carboxylic acid derivatives of sulfurized cinchona bark alkaloids, which latter are described and claimed in U. S. patent application, R. E. Lawrence, Serial No. 685,652, filed August 17, 1933. In general my sulfurized carboxylic acid derivatives are less soluble in water or acids than are the carboxylic acid derivatives of sulfurized cinchona bark alkaloids. Also, my sulfurized products are somewhat darker in color and usually lack the red shade noted in the products of the reaction of carboxylic acids on sulfurized cinchona bark alkaloids. My products show various other differences, for example, when quinoidine is treated with acetic acid and then sulfurized a brittle solid is obtained, while the action of acetic acid on sulfurized quinoidine results in a thick liquid product.

A large number of carboxylic acids have been combined with cinchona bark alkaloids and it was found that those carboxylic acids which are soluble in dilute, for instance 5%, sulfuric acid are particularly well adapted to produce novel reaction products which are of value as corrosion inhibitors. The carboxylic acids may be replaced by their corresponding anhydrides.

In the manufacture of my carboxylic acid derivatives of cinchona bark alkaloids, the acid and alkaloid are brought together and heated. When using carboxylic acids that are liquid at ordinary temperatures, such as formic, acetic, or butyric acids, I may reflux the acid with the alkaloid, or I may melt the cinchona bark alkaloid and add hot acid. Or, if desired, a dilute acid-alkaloid mixture may be cooked down to remove water. With acids solid at ordinary temperatures, I prefer to mix the acid and alkaloid and melt them together. I do not intend to be limited to the above mentioned modes of production, as it is only necessary that a concentrated carboxylic acid be heated in the presence of the cinchona bark alkaloid, and various modes of procedures will occur to one working in the art.

Among the cinchona bark alkaloids I may mention as suitable quinine, quinidine, cinchonine, and quinoidine. I prefer to use quinoidine and shall use it hereafter in my examples as typical of the cinchona bark alkaloids. Instead of using any one alkaloid, mixtures of several can be used.

Reaction products of quinoidine with various organic carboxylic acids were prepared using equal weights of each. Some of these products are listed below in approximately the order of their efficiency as inhibitors:

| Reaction product of 1 part quinoidine with 1 part | Physical state | Color |
|---|---|---|
| Salicylic acid | Brittle solid | Brown. |
| Chloracetic acid | Gummy solid | Brown. |
| Formic acid | Mobile liquid | Reddish brown. |
| Citric acid | Brittle solid | Brown. |
| Oxalic acid | Brittle solid | Brown. |
| Tartaric acid | Brittle solid | Brown. |
| Benzoic acid | Brittle solid | Brown. |
| Acetic acid | Thick liquid | Reddish brown. |
| Lactic acid | Heavy gum | Brown. |
| Succinic acid | Sticky gum | Brown. |

The amount of carboxylic acid used may be widely varied, but in general I prefer to use between about one-half to two parts by weight of acid to one of quinoidine. In some instances there will be incomplete reaction, while in other cases there may be an excess of carboxylic acid which will remain in the product. In both cases the products are entirely suitable as inhibitors. If a carboxylic acid insoluble in dilute sulfuric acid, such as oleic, linoleic, or stearic, were used, any excess of acid would separate from the acid cleaning bath. Consequently, when using such acid insoluble carboxylic acids, I prefer to avoid the use of an excess, or to separate the excess before addition to the cleaning bath.

As heretofore noted, sulfurization of my carboxylic acid derivatives of cinchona bark alkaloids results in new organic compounds having a higher efficiency as inhibitors. The sulfurization may be carried out by melting, or refluxing the carboxylic acid derivative of cinchona bark alkaloids with sulfur. Other modes of sulfurization may be followed if desired, for instance, the use of sulfur chlorides, or the use of catalysts, such as aluminum or antimony chlorides, plus sulfur.

The following table lists the properties of a few sulfurization products obtained by using 5% of sulfur. This furnishes 10% of sulfur on the basis of the quinoidine content. The examples are given in the approximate order of their efficiencies as inhibitors:

| 5% sulfur reacted with the reaction product of 1 part quinoidine with 1 part of | Physical state | Color |
| --- | --- | --- |
| Benzoic acid | Heavy gum | Brown. |
| Chloracetic acid | Brittle solid | Brown. |
| Salicylic acid | Brittle solid | Brown. |
| Acetic acid | Brittle solid | Brown. |
| Citric acid | Brittle solid | Brown. |
| Tartaric acid | Brittle solid | Brown. |
| Formic acid | Mobile liquid | Brown. |
| Succinic acid | Brittle solid | Brown. |
| Lactic acid | Sticky gum | Brown. |
| Oxalic acid | Brittle solid | Brown. |

As above set forth, the amount of carboxylic acid may be varied. In the table below are listed the products obtained by sulfurizing the reaction product of one part by weight carboxylic acid with two parts by weight quinoidine. Two parts by weight of sulfur were used to thirty of the reaction product, which is 10% by weight of sulfur based on the quinoidine. The products are listed in the approximate order of their efficiencies:

| 2 parts sulfur with reaction product of 20 parts quinoidine and 10 parts | Physical state | Color |
| --- | --- | --- |
| Acetic acid | Brittle solid | Dark brown. |
| Chloracetic acid | Brittle solid | Brown. |
| Citric acid | Brittle solid | Brown. |
| Benzoic acid | Brittle solid | Brown. |

In the above examples the sulfur is used in an amount equivalent to about 10% by weight of the quinoidine content of the carboxylic acid derivative of quinoidine. While this is my preferred proportion of sulfur, I may use widely varying amounts. Generally, good results are obtained with from about 5% to 20% sulfur based on the quinoidine.

One principal use which I have found for my new organic compounds is as inhibitors in cleaning and pickling solutions.

Pickling and metal cleaning operations frequently involve the use of a bath of dilute, non-oxidizing acids, such as sulfuric, hydrochloric, acetic, formic, aqueous solutions of acid sulfates, etc., and such baths are used for numerous purposes, of which pickling in steel mills is the most typical representative. The composition, concentration, temperature and other factors vary with different baths, but the underlying principle comprises, in all cases, the removal of undesirable incrustations by the action of the acid. The base metal so obtained is then, in the absence of an inhibitor, unavoidably subjected to attack by the acid with unnecessary loss of metal, weakening of the article, and unnecessary consumption of acid.

The application of my invention to acid pickling and acid metal cleaning operations does not involve any change in the baths or in the operation thereof, except for the addition of a small amount of the products of my invention. My inhibitors will, to a large extent, prevent attack of acid on the base metal, when added in quantities as small as 0.01%.

I prefer to use between about 0.02% and 0.1%, but more may be used if desired.

The carboxylic acid derivatives of cinchona bark alkaloids and the sulfurized carboxylic acid derivatives of cinchona bark alkaloids may be sold in dry form, alone or admixed with other agents, such as foaming agents, which it is desired to add to cleaning or pickling solutions. Or, if desired, my inhibitors may be sold in the form of solutions in suitable solvents, such as acids, for example, sulfuric acid, formic acid, etc.

I claim:
1. In a process for the manufacture of sulfurized carboxylic acid derivatives of cinchona bark alkaloids, the steps comprising: reacting a cinchona bark alkaloid with a concentrated carboxylic acid, and sulfurizing the resulting carboxylic acid derivative of the cinchona bark alkaloid.

2. In a process for the manufacture of sulfurized carboxylic acid derivatives of quinoidine, the steps comprising: reacting quinoidine with a concentrated carboxylic acid, and sulfurizing the resulting carboxylic acid derivative of quinoidine.

3. An inhibitor composition for use in cleaning and pickling metals comprising a cinchona bark alkaloid derivative selected from the group consisting of reaction products of cinchona bark alkaloids with concentrated carboxylic acids and sulfurization products of the said reaction products.

4. An inhibitor composition for use in cleaning and pickling metals comprising a quinoidine derivative selected from the group consisting of reaction products of quinoidine with concentrated carboxylic acids and sulfurization products of the said reaction products.

5. An inhibitor composition for use in cleaning and pickling metals comprising a sulfurized reaction product of quinoidine with a concentrated carboxylic acid.

6. An inhibitor composition for use in cleaning and pickling metals comprising a sulfurized reaction product of quinoidine with concentrated acetic acid.

7. An inhibitor composition for use in cleaning and pickling metals comprising a sulfurized reaction product of quinoidine with concentrated benzoic acid.

8. An inhibitor composition for use in cleaning and pickling metals comprising a sulfurized reaction product of quinoidine with concentrated chloracetic acid.

9. A composition of matter comprising a cinchona bark alkaloid derivative selected from the group consisting of reaction products of cinchona bark alkaloids with concentrated carboxylic acids and sulfurization products of the said reaction products.

10. A composition of matter comprising a quinoidine derivative selected from the group consisting of reaction products of quinoidine with concentrated carboxylic acids and sulfurization products of the said reaction products.

11. A composition of matter comprising a sulfurized reaction product of quinoidine with a concentrated carboxylic acid.

12. A composition of matter comprising a sulfurized reaction product of quinoidine with a concentrated carboxylic acid from the group consisting of acetic, benzoic, and chloracetic acids.

13. A cleaning and pickling bath for metals comprising a dilute non-oxidizing acid containing a small amount of a cinchona bark alkaloid derivative selected from the group consisting of reaction products of cinchona bark alkaloids with concentrated carboxylic acids and sulfurization products of the said reaction products.

14. A cleaning and pickling bath for metals comprising a dilute non-oxidizing acid containing a small amount of a quinoidine derivative selected from the group consisting of reaction products of quinoidine with concentrated carboxylic acids and sulfurization products of the said reaction products.

15. A cleaning and pickling bath for metals comprising a dilute non-oxidizing acid containing a small amount of a sulfurized reaction product of quinoidine with a concentrated carboxylic acid.

16. In a process of cleaning and pickling metals, the step comprising contacting the metals with an acid solution containing a cinchona bark alkaloid derivative selected from the group consisting of reaction products of cinchona bark alkaloids with concentrated carboxylic acids and sulfurization products of the said reaction products.

17. In a process of cleaning and pickling metals, the step comprising contacting the metals with an acid solution containing a quinoidine derivative selected from the group consisting of reaction products of quinoidine with concentrated carboxylic acids and sulfurization products of the said reaction products.

18. In a process of cleaning and pickling metals, the step comprising contacting the metals with an acid solution containing a sulfurized reaction product of quinoidine with a concentrated carboxylic acid.

GEORGE LUTZ.